United States Patent [19]

Mabuchi et al.

[11] 4,002,692

[45] Jan. 11, 1977

[54] PROCESS FOR THE REACTIVATION OF NICKEL CATALYSTS USED IN THE HYDROGENATION OF POLYMERIC PEROXIDES

[75] Inventors: Shunsuke Mabuchi; Kenji Tsuzuki; Hideaki Matsunaga, all of Shin-nanyo, Japan

[73] Assignee: Toyo Soda Manufacturing Co., Ltd., Yamaguchi, Japan

[22] Filed: Oct. 3, 1975

[21] Appl. No.: 619,227

[30] Foreign Application Priority Data

Oct. 15, 1974 Japan .............. 49-117694

[52] U.S. Cl. .................. 260/617 R; 252/412; 252/414; 260/347.8; 260/618 C; 260/635 R
[51] Int. Cl.$^2$ .................. C07C 29/00; B01J 37/00
[58] Field of Search ....... 260/617 R, 618 C, 635 R, 260/347.8; 252/412, 414

[56] References Cited

UNITED STATES PATENTS

| 3,670,041 | 6/1972 | Juhl et al. .................. 252/414 |
| 3,896,051 | 7/1975 | Mabuchi et al. .................. 252/414 |

FOREIGN PATENTS OR APPLICATIONS

| 833,592 | 11/1957 | United Kingdom .............. 252/412 |

*Primary Examiner*—Norman Morgenstern
*Attorney, Agent, or Firm*—Oblon, Fisher, Spivak, McClelland & Maier

[57] ABSTRACT

The poisoned nickel catalyst obtained from the hydrogenation of an organopolymeric peroxide with hydrogen in an organic solvent is reactivated by treating the poisoned nickel catalyst with hydrogen in an oxygen containing polar organic solvent at 140° – 250° C.

5 Claims, No Drawings

PROCESS FOR THE REACTIVATION OF NICKEL CATALYSTS USED IN THE HYDROGENATION OF POLYMERIC PEROXIDES

BACKGROUND OF THE INVENTION

1. Field of the Invention

The present invention relates to a process for the hydrogenation of organopolymeric peroxides wherein the nickel catalyst is reactivated. More particularly, it relates to a process for the reactivation of a nickel catalyst which can contain another metal such as copper, chromium, rhenium, iron, or the like and which is used in the hydrogenation of polymeric peroxides.

2. Description of the Prior Art

Heretofore, methods of reactivating nickel catalysts have included such techniques as treating the catalyst with an organic acid or a base and oxidizing the catalyst with oxygen or air and then hydrogenating the same. However, these conventional methods can be applied only on those nickel catalysts which are used for certain reactions. For many reactions, the reactivation techniques are not practical. Certainly, it has not been known to reactivate nickel catalysts which have been used in the hydrogenation of organopolymeric peroxides.

Various diols can be produced by the hydrogenation of organopolymeric peroxides with nickel catalysts such as Raney nickel and nickel which is durable to sulfur. (Japanese Unexamined Patent Publication Nos. 19511/1973 and 43908/1974). These catalysts are substantially poisoned during the hydrogenation of organopolymeric peroxides. Accordingly, the amount of the organopolymeric peroxide which is hydrogenated is limited and depends upon the amount of the catalyst used.

In order to increase the yield of diol per unit amount of the catalyst, the catalyst must be reactivated by a special treatment. One proposed method of reactivating poisoned Raney nickel catalysts has been to heat the catalyst in an alkaline aqueous solution (Japanese unexamimed Patent Publication Nos. 66000/1974 and 88290/1974). However, the method requires different solvents for the hydrogenation of the organopolymeric peroxide and the reactivation of the catalyst. This means an operation must be provided for the replacement of solvent which is a complicated industrial operation.

A need, therefore, continues to exist for a method of reactivating nickel catalysts used in the hydrogenation of organopolymeric peroxides.

SUMMARY OF THE INVENTION

Accordingly, one object of the invention is to provide a process for the hydrogenation of organopolymeric peroxides wherein the efficiency of the hydrogenation reaction is improved by the effective reactivation of the nickel catalyst.

Briefly, this object and other objects of the present invention, as hereinafter will become more readily apparent, can be attained by reactivating the poisoned nickel catalyst obtained from the hydrogenation of an organopolymeric peroxide in an oxygen containing polar organic solvent which is stable under hydrogenation conditions at 140° – 250° C when contacted with hydrogen.

DETAILED DESCRIPTION OF THE PREFERRED EMBODIMENTS

In the process of the invention, the spent nickel catalyst used in the hydrogenation of an organopolymeric peroxide is separated and is reactivated in an organic solvent which is durable under hydrogenation conditions at a temperature of 140° – 250° C when contacted with hydrogen. This treatment can effectively reactivate the poisoned catalyst. The solvents used in the reactivation step of the catalyst should be durable to hydrogenation, and are preferably oxygen-containing polar organic solvents such as methanol, tetrahydrofuran, fatty acid esters, dioxane and the like. It is especially preferable to use a solvent which is the same as the solvent used in the hydrogenation of the organopolymeric peroxide. The hydrogen pressure in the reactivation of the catalyst is in the range of 1 – 300 $Kg/cm^2$. The reactivation of the catalyst cannot be attained by only heating the poisoned nickel catalyst in an organic solvent under an inert gas atmosphere such as nitrogen gas. To the contrary, the catalyst can only be reactivated by contacting it with hydrogen.

The temperature in the reactivation of the catalyst is in the range of 140° – 250° C, preferably 150° – 200° C. If the temperature is less than 140° C, the reactivation speed is too slow. If it is higher than 250° C, there is no advantage. The time over which the catalyst is reactivated is dependent upon the degree of deterioration of the catalytic activity. If substantial deterioration of the catalyst has occurred, a long time is required for reactivation. If the catalyst has only deteriorated slightly, the time needed for reactivation can be quite short. For example, if the reactivation of the nickel catalyst is conducted after each hydrogenation of 2 – 5 parts by weight of polymeric butadiene peroxide to 1 part by weight of the catalyst, the time for reactivation can range from 3 – 10 hours, which is sufficient to yield a reactivated catalyst having substantial activity for a long period of time.

Suitable nickel catalysts useful in the present invention include support nickel catalysts and supported combinations of nickel and another metal such as copper, chromium, rehenium, iron or the like, on a carrier of diatomaceous earth, alumina, silica gel, pumice, or the like.

Suitable organopolymeric peroxides used in the present invention include polymeric peroxides of conjugated diolefins such as butadiene, isoprene, 2,5-dimethyl-2,4-hexadiene; alkyl-substituted conjugated diolefins; cyclo-conjugated diolefins such as cyclopentadiene, cyclohexadiene, dimethyl furan, furan; alkyl-substituted cyclo-conjugated diolefins; and olefins such as indene, styrene and the like.

The conditions under which the organopolymeric peroxide are hydrogenated include the conventional ones which are well-known hydrogenation techniques.

Having generally described the invention, a more complete understanding can be obtained by reference to certain specific examples, which are provided for purposes of illustration only and are not intended to be limiting unless otherwise specified.

EXAMPLE 1

Into a 200 cc autoclave equipped with an electromagnetic stirrer were charged 10 g of a nickel catalyst which is durable when exposed to sulfur-containing sources (manufactured by Nikki Kagaku K.K.) and 50 g of ethylacetate. A 16 g amount of an ethyl acetate solution containing 18 g of polymeric butadiene peroxide was fed over 4 hours by a microvolumetric pump under 50 Kg/cm² of hydrogen pressure at 70° C. The polymeric butadiene peroxide obtained was contacted with hydrogen and the hydrogenation of polymeric butadiene peroxide was conducted by raising the reaction temperature from 70° C to 150° C for 3 hours. After the reaction, the nickel catalyst was separated and the reaction mixture was analyzed by gas chromatography, whereby 10.30 g of 1,4-butanediol, 4.17 g of 1,2-butanediol and 2.00 g of other components were obtained. The yield of 1,4-butanediol based on the starting amount of polymeric butadiene peroxide was 54%.

The catalyst in the reaction and 100 cc of ethyl acetate were charged into a 200 cc autoclave equipped with a magnetic stirrer and the mixture was stirred at 180° C for 3 hours under 50 Kg/cm² of hydrogen pressure. This procedure accomplished the reactivation of the nickel catalyst. The catalyst was separated and used in the hydrogenation of polymeric butadiene peroxide. The catalytic reaction was repeated 50 times, but no deterioration of the catalyst was found. The nickel

| Type of Ni | Ni + NiO |
|---|---|

REFERENCE EXAMPLE 1

In accordance with the process of Example 1, 18 g of polymeric butadiene peroxide was hydrogenated in the presence of 10 g of the durable nickel catalyst. The separated catalyst was repeatedly used for the hydrogenation of polymeric butadiene peroxide without a reactivation of the catalyst. After the hydrogenation reaction was repeated 7 times, the yield of 1,4-butanediol had decreased to 35%.

EXAMPLES 2 – 6

In accordance with the process of Example 1, the hydrogenation of polymeric butadiene peroxide was conducted under the conditions shown in Table 1. The catalysts were reactivated under the conditions shown in Table 1. The hydrogenation of polymeric butadiene peroxide and the catalyst reactivation were repeated. The results are shown in Table 1.

TABLE 1

| Conditions of Reaction | Exp. 2 | | Exp. 3 | | Exp. 4 | | Exp.5 | | Ref.1** | Exp.6 | | Ref.2** |
|---|---|---|---|---|---|---|---|---|---|---|---|---|
| Polymeric butadiene peroxide (g) | 18 | 18 | 18 | 18 | 18 | 18 | 18 | 18 | 18 | 18 | 18 | 18 |
| (mole) | 0.21 | 0.21 | 0.21 | 0.21 | 0.21 | 0.21 | 0.21 | 0.21 | 0.21 | 0.21 | 0.21 | 0.21 |
| Catalyst (g) | *1 | *1 | *1 | *1 | *1 | *1 | *2 | *2 | *2 | *3 | *3 | *3 |
|  | 10 | 10 | 10 | 10 | 10 | 10 | 10 | 10 | 10 | 10 | 10 | 10 |
| Temperature (° C) | 70–150 | 70–150 | 70–150 | 70–150 | 70–150 | 70–150 | 70–150 | 70–150 | 70–150 | 70–150 | 70–150 | 70–150 |
| Pressure (Kg/cm²) | 50 | 50 | 100 | 100 | 100 | 100 | 50 | 50 | 50 | 50 | 50 | 50 |
| Number of times the catalyst was used | 1 | 20 | 1 | 70 | 1 | 15 | 1 | 40 | 3 | 1 | 50 | 7 |
| Reaction Conditions |  |  |  |  |  |  |  |  |  |  |  |  |
| Solvent (cc) |  | MeOAc |  | THF |  | EtOAc |  | THF |  |  | MeOH |  |
|  |  | 100 |  | 100 |  | 100 |  | 100 |  |  | 100 |  |
| Temperature (° C) |  | 150 |  | 180 |  | 200 |  | 180 |  |  | 250 |  |
| Hydrogen pressure (Kg/cm²) |  | 100 |  | 300 |  | 1 |  | 50 |  |  | 90 |  |
| Product: |  |  |  |  |  |  |  |  |  |  |  |  |
| 1,4-butanediol (g) | 10.2 | 9.8 | 10.3 | 10.0 | 10.1 | 9.7 | 9.8 | 9.5 | 6.6 | 10.0 | 9.7 | 7.0 |
| 1,2-butanediol (g) | 4.0 | 3.7 | 4.1 | 3.9 | 4.0 | 3.7 | 3.6 | 3.4 | 2.3 | 4.0 | 3.7 | 2.5 |
| Others (g) | 1.7 | 1.8 | 1.7 | 1.6 | 1.8 | 1.7 | 1.7 | 1.8 | 3.5 | 1.6 | 1.6 | 3.3 |
| Yield of 1,4-butanediol (%) | 54 | 52 | 54 | 53 | 53 | 51 | 52 | 50 | 35 | 53 | 51 | 37 |

*1 : nickel which is durable to sulfur containing sources
*2 : stabilized nickel Chemical Composition: Ni 49–52%; diatomaceous earth 27 – 29%; graphite 4 – 5%.
*3 : reduced nickel Chemical Composition: Ni 45 – 47%; rhenium 2 – 3%; diatomaceous earth 27 –29%; graphite 4 – 5%.
MeOAc: methyl acetate
THF: tetrahydrofuran
MeOH: methanol
EtOAC: ethyl acetate
**The catalyst was repeatedly used for the hydrogenation of each peroxide polymer without reactivation.

catalyst which is durable to sulfur containing sources (Nikki Kagaku K.K.) has the following formula:

| Ni | 45 – 47% |
|---|---|
| Cr | 2 – 3% |
| Cu | 2 – 3% |
| diatomaceous earth | 27 – 29% |
| graphite | 4 – 5% |

EXAMPLES 7 – 10

In accordance with the process of Example 1, the hydrogenation of various peroxide polymers was conducted under the conditions shown in Table 2, and the reactivation of the catalysts was conducted under the conditions shown in Table 2. The hydrogenation of the peroxide polymers and the reactivation of the catalysts were repeated. The results are shown in Table 2.

TABLE 2

| Condition of Reaction | Exp. 7 | | Ref. 3 ** | Exp. 8 | | Ref. 4 ** | Exp. 9 | | Ref. 5 ** | Exp. 10 | | Ref.6 ** |
|---|---|---|---|---|---|---|---|---|---|---|---|---|
| Sample |  |  |  |  |  |  |  |  |  |  |  |  |
| IPPP (g) | 20 | 20 | 20 |  |  |  |  |  |  |  |  |  |
| (mole) | 0.20 | 0.20 | 0.20 |  |  |  |  |  |  |  |  |  |
| MHDPP (g) |  |  |  | 20 | 20 | 20 |  |  |  |  |  |  |
| (mole) |  |  |  | 0.14 | 0.14 | 0.14 |  |  |  |  |  |  |
| CPPP (g) |  |  |  |  |  |  | 20 | 20 | 20 |  |  |  |
| (mole) |  |  |  |  |  |  | 0.20 | 0.20 | 0.20 |  |  |  |

TABLE 2-continued

| Condition of Reaction | Exp. 7 | Ref. 3 ** | Exp. 8 | Ref. 4 ** | | | Exp. 9 | Ref. 5 ** | | Exp. 10 | | Ref.6 ** |
|---|---|---|---|---|---|---|---|---|---|---|---|---|
| SPP (g) | | | | | | | | | | 20 | 20 | 20 |
| (mole) | | | | | | | | | | 0.15 | 0.15 | 0.15 |
| | *1 | *1 | *1 | *2 | *2 | *2 | *1 | *1 | *1 | *1 | *1 | *1 |
| Catalyst (g) | 10 | 10 | 10 | 10 | 10 | 10 | 10 | 10 | 10 | 10 | 10 | 10 |
| Temperature (° C) | 60–150 | 60–150 | 60–150 | 50–140 | 50–140 | 50–140 | 50–100 | 50–100 | 50–100 | 50–100 | 50–100 | 50–100 |
| Pressure (Kg/cm²) | 50 | 50 | 50 | 90 | 90 | 90 | 60 | 60 | 60 | 50 | 50 | 50 |
| Number of times catalyst was used | 1 | 20 | 5 | 1 | 40 | 6 | 1 | 30 | 7 | 1 | 50 | 8 |
| Solvent (cc) | | EtOAc 100 | — | | THF 100 | — | | MeOH 100 | — | | THF 100 | — |
| Temperature (° C) | | 200 | — | | 160 | — | | 140 | — | | 140 | — |
| Pressure of hydrogen (Kg/cm²) | | 5 | — | | 90 | — | | 200 | — | | 50 | — |
| Diol (g) | | | | | | | | | | | | |
| 2-methyl-1,2-butanediol | 1.7 | 1.5 | | | | | | | | | | |
| 2-methyl-3,4-butanediol | 1.4 | 1.3 | 0.7 | | | | | | | | | |
| 2-methyl-1,4-butanediol | 6.4 | 6.1 | 3.5 | | | | | | | | | |
| 2.5-dimethyl-2,5-hexanediol | | | | 17.2 | 16.0 | | | | | | | |
| 1,4-cyclopentanediol | | | | | | | 15.3 | 15.0 | | | | |
| benzyl alcohol | | | | | | | | | | 1.3 | 1.2 | |
| phenyl glycol | | | | | | | | | | 16.4 | 15.9 | 8.0 |
| Yield of total diol (%) | 46 | 43 | 25 | 84 | 79 | 45 | 75 | 74 | 35 | 79 | 77 | 39 |

IPPP: isoprene peroxide polymer
MHDPP: 2,5-dimethyl-2,4-hexadiene peroxide polymer
CPPP: cyclopentadiene peroxide polymer
SPP: styrene peroxide polymer
*1 : nickel which is durable to sulfur containing materials
*2 : stabilized nickel Chemical Composition: Ni 49–52%; diatomaceous earth 27 – 29%; graphite: 4–5%.
EtOAC: ethyl acetate
THF: tetrahydrofuran
McOH: methanol
** : The catalyst was repeatedly used for hydrogenation of each polymeric peroxide without reactivation.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a process for the hydrogenation of an organopolymeric peroxide in the presence of a nickel catalyst with hydrogen in an organic solvent, the improvement comprising:
    reactivating said nickel catalyst by contacting it with a reactivating medium consisting essentially of hydrogen and an oxygen-containing polar organic solvent at a temperature of 140°–250° C; said oxygen-containing polar solvent being stable under conditions of the reactivation; and
    recycling the reactivated nickel catalyst to said hydrogenation.

2. The process of claim 1, wherein said nickel catalyst contains at least 30% nickel metal based on the total catalyst.

3. The process of claim 2, wherein said nickel catalyst is supported on a carrier.

4. The process of claim 1, wherein said oxygen containing polar organic solvent is the same solvent used in the hydrogenation reaction.

5. The process of claim 1, wherein said organopolymeric peroxide is a polymeric peroxide of a conjugated diolefin, an alkyl-substituted conjugated diolefin, a cyclo-conjugated diolefin, an alkyl-substituted cyclo-conjugated diolefin, or an olefin.

* * * * *